United States Patent [19]
Liu

[11] Patent Number: 5,747,778
[45] Date of Patent: May 5, 1998

[54] HOT MELTING IRON HAVING A SAFETY CONTROL CIRCUIT BOARD

[76] Inventor: Jung-Yang Liu, 68, Lane 766, Chin Hsing Rd, Taichung, Taiwan

[21] Appl. No.: 583,610

[22] Filed: Jan. 5, 1996

[51] Int. Cl.$^6$ .................................................. H05B 1/02
[52] U.S. Cl. ...................... 219/506; 219/241; 219/497; 219/501; 340/588
[58] Field of Search ........................... 219/240, 241, 219/248, 487, 501, 497, 505, 506, 491; 340/588

[56] References Cited

U.S. PATENT DOCUMENTS

| | | | |
|---|---|---|---|
| 4,347,428 | 8/1982 | Conrad et al. | 219/251 |
| 4,580,038 | 4/1986 | O'Loughlin | 219/506 |
| 4,686,352 | 8/1987 | Nawrot et al. | 219/250 |
| 4,788,398 | 11/1988 | Hornung | 219/483 |
| 5,160,831 | 11/1992 | Thaler et al. | 219/506 |
| 5,183,998 | 2/1993 | Hoffman et al. | 219/492 |
| 5,229,579 | 7/1993 | Ingraham et al. | 219/202 |

*Primary Examiner*—Mark H. Paschall
*Attorney, Agent, or Firm*—Beveridge, DeGrandi, Weilacher & Young, LLP

[57] ABSTRACT

A safety device for irons used for models includes a control electrical circuit board accommodated within an iron and mounted with a temperature setting knob controllable by a variable resistor, a central processing unit, an output control device, a heater, a sensor, and an indicator having three light emitting diodes of three different colors. When power is on, the central processing unit will examine the control circuit to ensure that the iron is in a normal state before causing the iron to be heated to a set temperature. The central processing unit will keep on checking the control circuit and, once the temperature of the iron is sensed to be unstable or abnormal, the light emitting diodes will indicate trouble and power will be cut off to protect the control circuit board.

3 Claims, 4 Drawing Sheets

HOT MELTING IRON HAVING A SAFETY CONTROL CIRCUIT BOARD

BACKGROUND OF THE INVENTION (a) Field of the Invention

The present invention relates generally to a safety device, and more particularly to a safety device for irons used in hot melt operations to control and indicate the heating temperature of the iron.

(b) Description of the Prior Art

In existing methods of forming outer coatings of models, such as model airplanes, plastic film coating is widely used due to its nice appearance. The outer coating generally consists of a plastic film printed with various colors and covered by a layer of hot-melt adhesive. Therefore, in application, a heat source of a stable temperature is required so that the adhesive may be heated to melt and adhere to the surface of the model airplane blank. Conventional irons for heating plastic films onto model airplanes are not capable of indicating temperature changes. As a result, the model airplanes may be damaged or burnt if the user is not aware of the changes in temperature of the iron when heating the plastic film. There is also another kind of iron, which is equipped with a control device consisting of a saw-tooth-wave generator and a temperature setting and sensing circuit connected to an input end of a comparator, in which, by means of a temperature setting knob of the control device, a set temperature value may be quickly reached. However, if the control device does not function, there is not means provided in this kind of iron to warn the user of the failure of the control device so that the user may continue using the iron without knowing that the temperature of the iron may have exceeded the set temperature value, resulting in the burning of the model products and the iron. Worse still, the internal electrical circuits may be damaged and result in fire, jeopardizing the personal safety of the user.

SUMMARY OF THE INVENTION

Accordingly, a primary object of the present invention is to provide a safety device for hot melting irons, in which a control circuit board is installed within an iron and includes a temperature setting knob controllable by a variable resistor, a central processing unit, an output control device, a heater, a sensor, and an indicator consisting of three light emitting diodes of different colors. When power is on, the central processing unit will examine the control circuit to ensure that the iron is in a normal state before causing the iron to be heated to a set temperature. The central processing unit will keep on checking the control circuit and, once the temperature of the iron is sensed to be unstable or abnormal, the light emitting diodes will indicate trouble and power will be cut off to protect the control circuit board.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
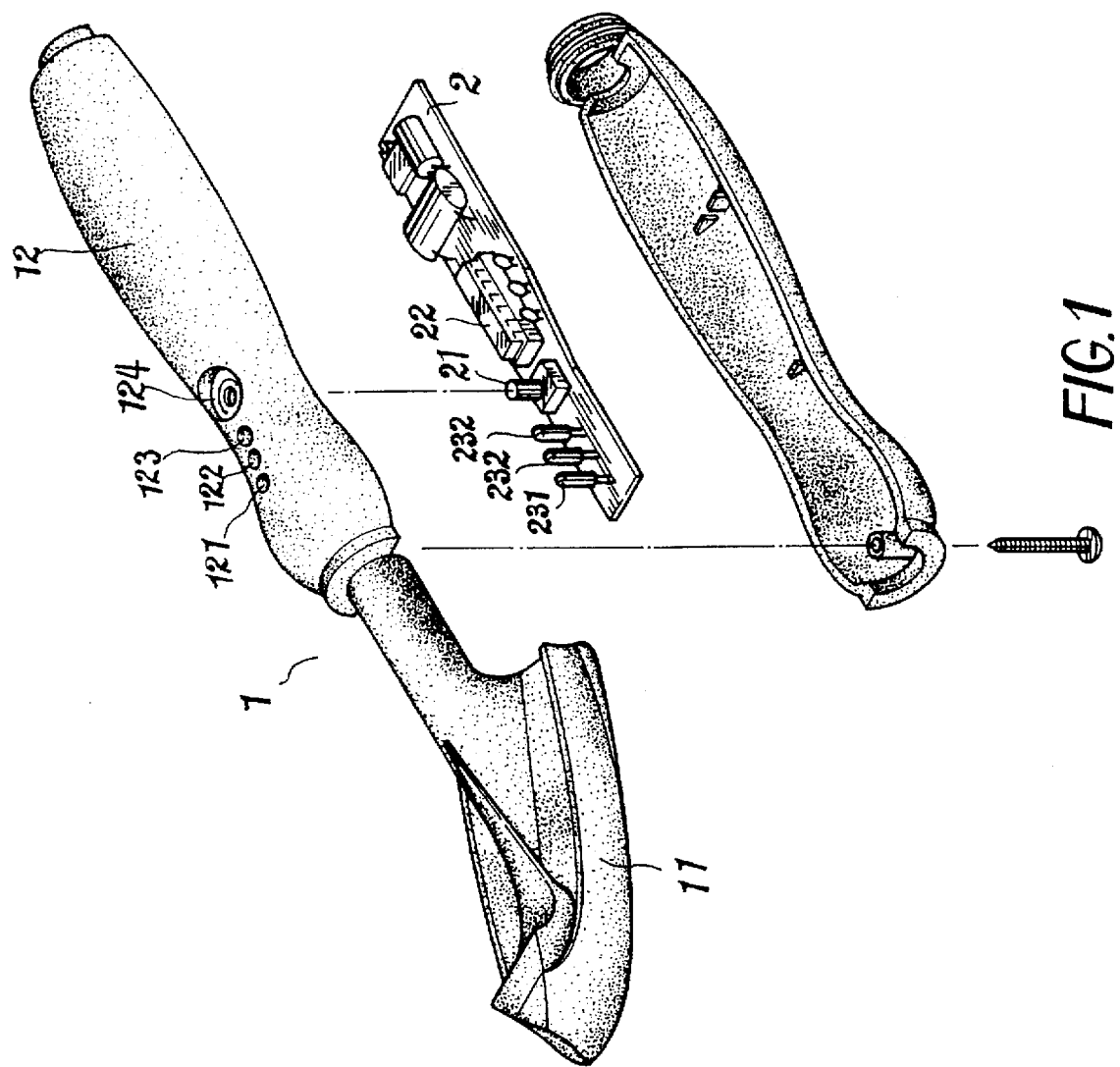
FIG. 1 is an elevational view of the present invention in an exploded state.
Figure 2:
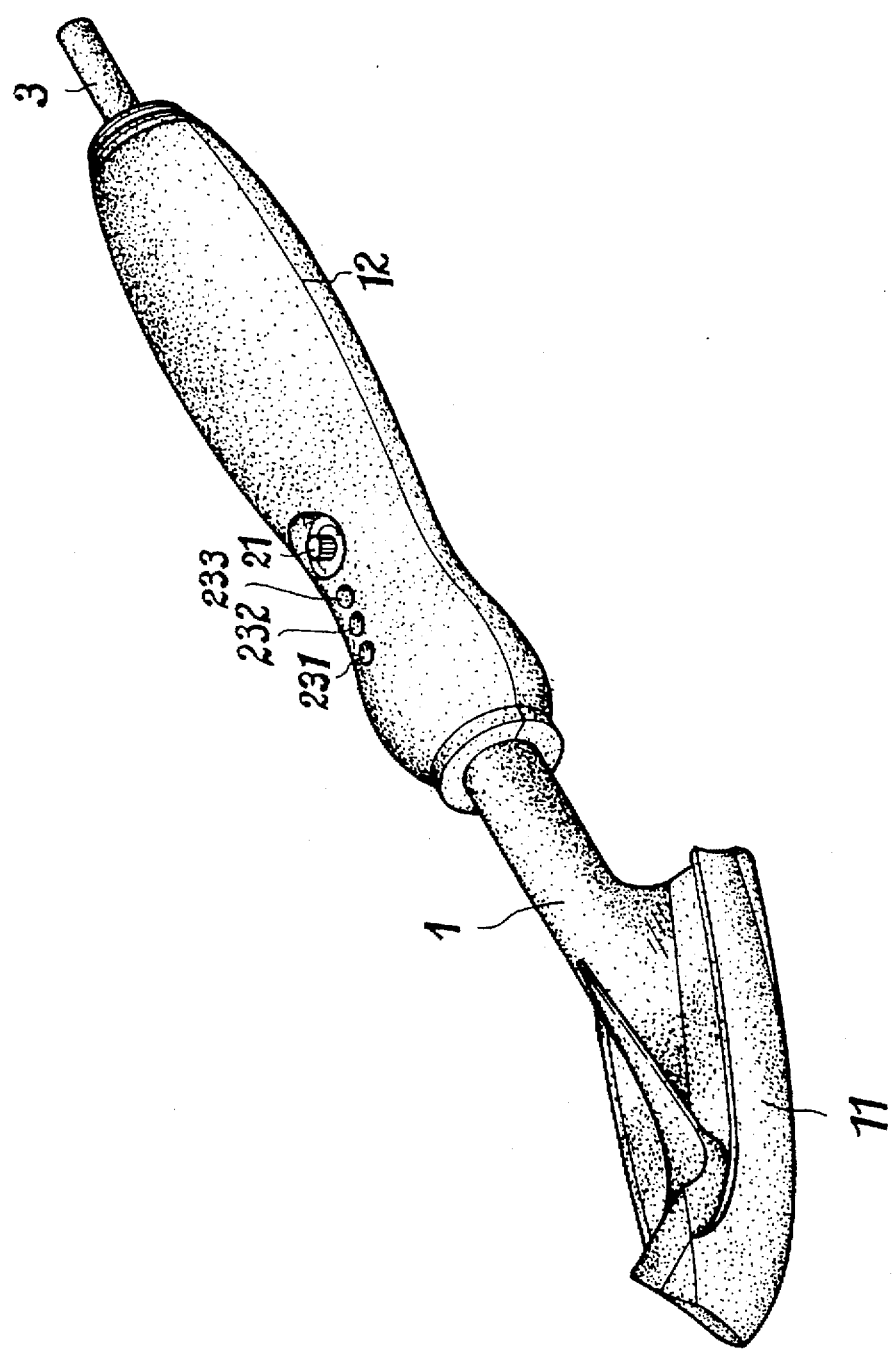
FIG. 2 is an elevational view of the present invention in an assembled state.
Figure 3:
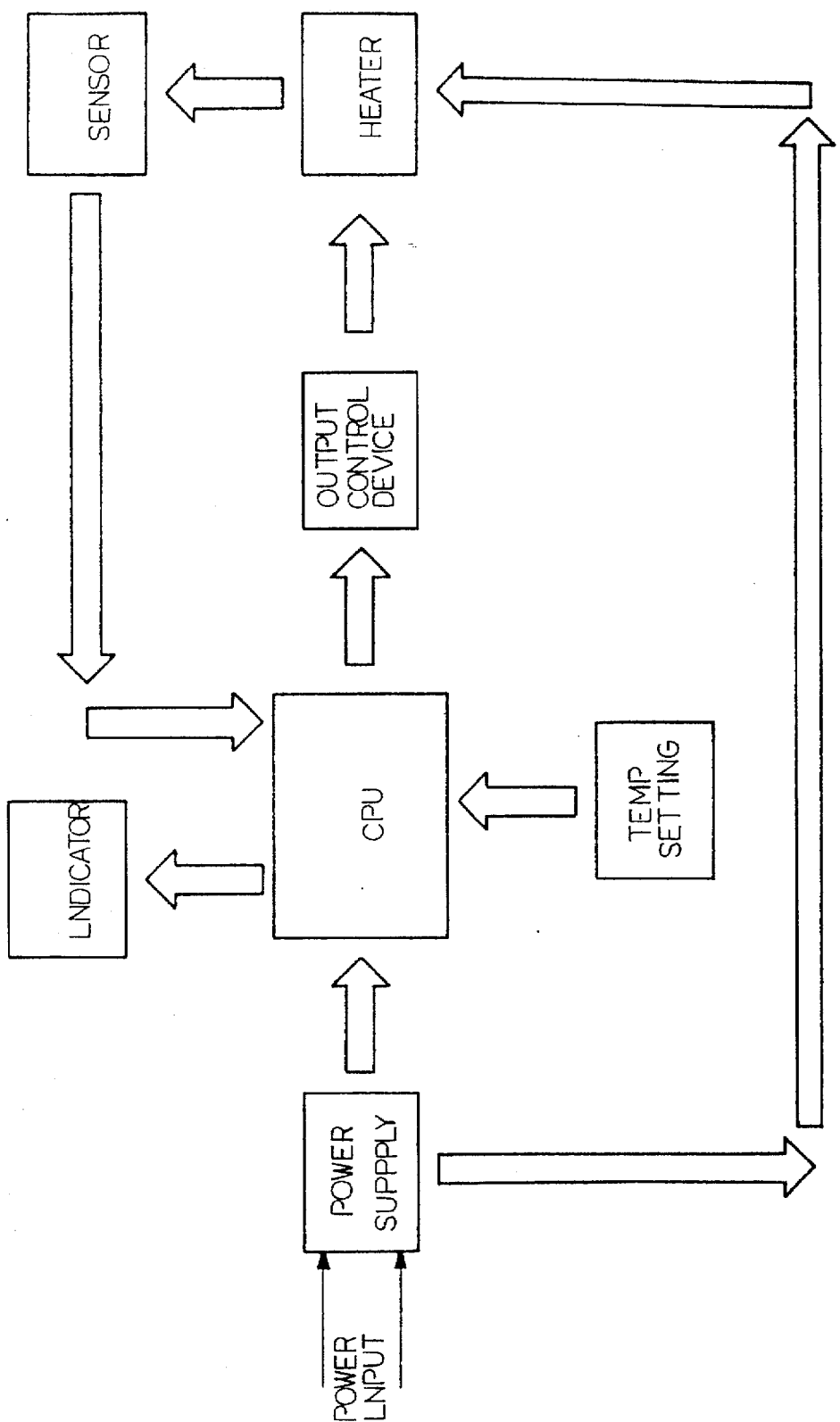
FIG. 3 is a control block diagram of the present invention.
Figure 4:
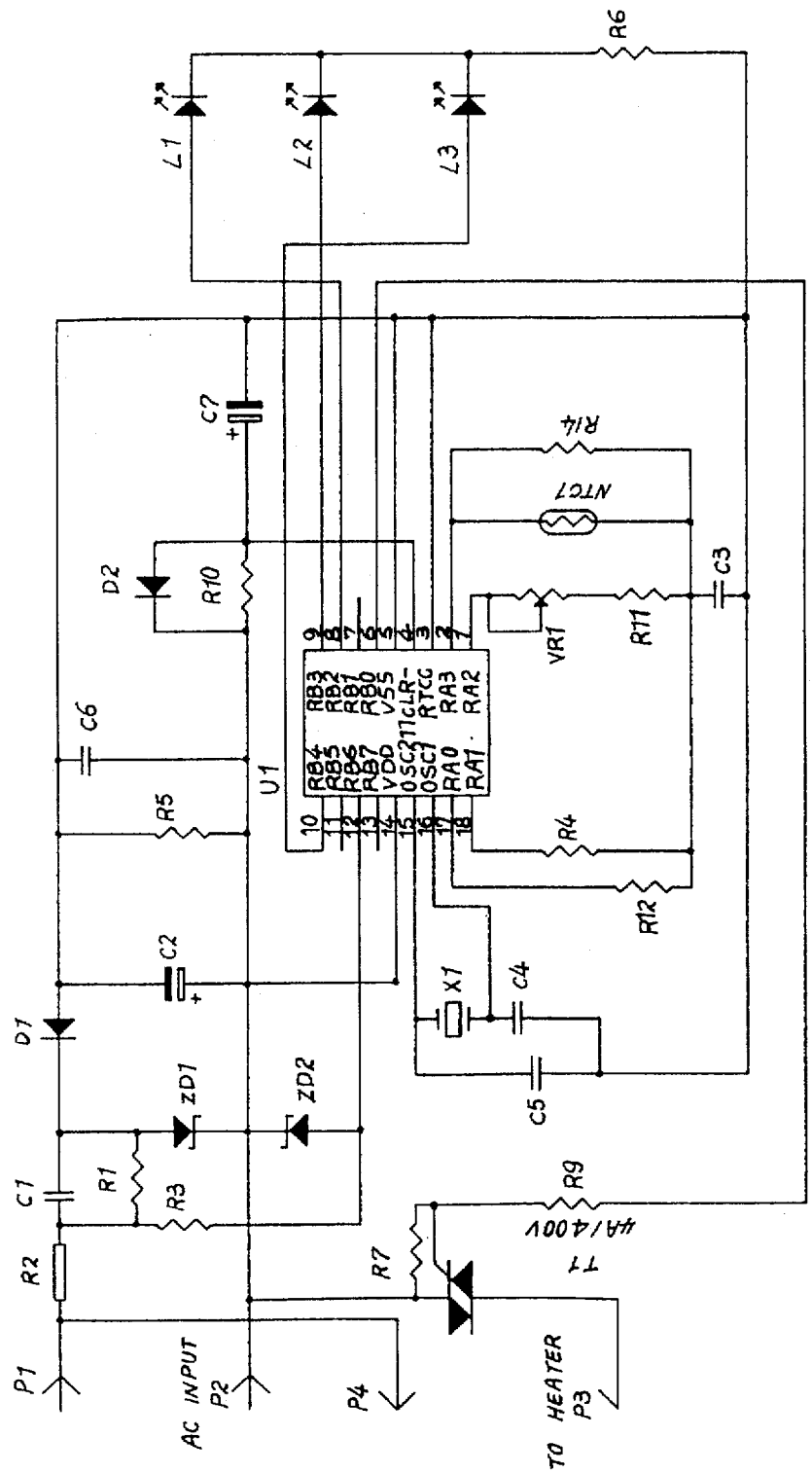
FIG. 4 is a circuit diagram of the present invention.

With reference to the drawings, a preferred embodiment of the safety device for hot melting irons essentially comprises an iron 1, a control circuit board 2 and an electrical wire 3. The iron 1 includes an iron plate 11 at a front end thereof connected to a handle 12. The handle 12 accommodates the control circuit board 2 connected to the electrical wire 3 at a rear end of the handle 12.

The electrical circuit board 2 has mounted thereon a temperature setting knob 21 controlled by a variable resistor, a central processing unit (CPU) 22, an indicator, a capacitor and a resistor. The CPU 2 further includes an output control device, a heater, and a sensor. The indicator consists of light emitting diodes (LEDs) of three different colors, i.e., a yellow LED 231, a green LED 232, and a red LED 233. Accordingly, the handle 12 is provided with respective holes 121, 122, 123 and 124 for accommodating and exposing the three LEDs as well as the temperature setting knob 21. The temperature setting knob 21 further projects a little distance from the surface of the handle 12 to facilitate operation. The circumferential edge of the hole 124 for accommodating the temperature setting knob 21 is further inscribed with graduations to indicate the temperature values.

When the iron 1 is connected to a power source, the CPU 22 will automatically examine the internal components to see if they are in a normal state. If any trouble is detected, the three LEDs 231, 232, and 233 will quickly flash, and power is immediately cut off. On the contrary, if all the components are detected to be in a normal state, the CPU 22 will, according to the set temperature input via the temperature setting knob 21, start the heating of the iron 1, while the yellow LED 231 will be on to indicate that the iron 1 has not been heated to the set temperature. During this interval, the CPU will continue checking the internal components to detect any trouble, while a timer thereof will be started. If the sensor does not change its detection value within a set time according to a set condition, it shows that the internal components have been damaged, and all the LEDs 231, 232, 233 will quickly flash to indicate trouble, and power will also be immediately cut off to ensure that the other components of the iron 1 will not be damaged.

When the iron 1 has resumed to a normal state, the green LED 232, instead of the yellow LED 231, will be on to show that the temperature of the iron 1 has reached the set temperature and the iron 1 is ready for operation. At the same time, the CPU 22 will continue to check the internal components to locate any trouble, and if the temperature is sensed to be abnormal, indicating that the internal components have been damaged, all the LEDs 231, 232 and 233 will quickly flash to indicate trouble, and power will be immediately cut off to prevent the other components from possible damage.

If it is desired to change the temperature at this point, the temperature setting knob 21 may be turned to set another temperature. If the preset temperature is higher than the temperature later set, the yellow LED 231 will be off and the red LED 233 will be on, and the user has to wait until the green LED 233 alone is on before proceeding with the ironing operation. Likewise, the CPU 22 will continue to check the internal components and if the temperature of the iron is found to be unstable, all the LEDs 231, 232 and 233 will quickly flash to indicate trouble, and power will be immediately cut off to protect the other components.

In the present invention, the CPU 22 is a single-chip microprocessor so that it is very compact and has powerful functions. It does not occupy space and may detect any trouble with the control circuit board. The LEDs are provided to clearly indicate the state of the iron and to warn the user of any trouble with the iron, ensuring that the iron as well as the workpiece may be damaged or burned.

Although the present invention has been illustrated and described with reference to the preferred embodiment thereof, it should be understood that it is in no way limited to the details of such embodiment but is capable of numerous modifications within the scope of the appended claims.

What is claimed is:

1. A hot melting iron comprising:

an iron plate having an appendage extending at an upward acute rearward angle;

a handle connected to said appendage of said iron plate, said handle
   having a symmetrically curved structure throughout a length thereof, and
   defining four holes therethrough;

a control electrical circuit board accommodated within said handle, said control electrical circuit board including
   a temperature setting knob passing through one of the four holes in said handle for controlling a variable resistor, whereby an user may select a temperature for operation with said temperature setting knob,
   a central processing unit electrically connected to said variable resistor, said central processing unit having a timer,
   an output control device electrically connected to said central processing unit,
   a heater connected to said output control device,
   a sensor for monitoring said heater and electrically connected to said central processing unit, and
   an indicator electrically connected to said central processing unit, said indicator having three light emitting diodes of different colors, each of said three light emitting diodes passing through one of the four holes in said handle, wherein said central processing unit
   analyzes said control electrical circuit board when power is provided and when the iron is in a normal state,
   causes the iron to be heated according to the set temperature, and
   cuts off power to the iron and controls the emitting diodes to flash immediately when a measurement of said sensor does not change according to a set condition within a set time as indicated by said timer.

2. A hot melting iron as claimed in claim 1, wherein said central processing unit, based on the setting of said temperature setting knob, controls said light emitting diodes to indicate the state of the iron.

3. A hot melting iron as claimed in claim 1, wherein said central processing unit is a single-chip microprocessor.

* * * * *